United States Patent Office 3,826,659
Patented July 30, 1974

3,826,659
HIGH ZIRCONIA CONTAINING GLASS CERAMICS
Terence Stanley Busby and Geoffrey Charles Cox, Sheffield, England, assignors to National Research Development Corporation
No Drawing. Filed May 1, 1972, Ser. No. 253,669
Claims priority, application Great Britain, May 5, 1971, 13,278/71; Nov. 27, 1971, 55,157/71
Int Cl. C03c 3/22, 3/04, 3/12
U.S. Cl. 106—39.6       11 Claims

ABSTRACT OF THE DISCLOSURE

A glass ceramic material comprising by weight 20% to 45% $ZrO_2$, 20% to 60% $Al_2O_3$, 0% to 25% $SiO_2$, 0% to 30% CaO, 0% to 10% $Na_2O$, the material including $B_2O_3$ and/or PbO in the amounts up to 35% and 25% respectively, $B_2O_3$ in the absence of PbO being in an amount more than 5%, PbO in the absence of $B_2O_3$ being in an amount more than 2%.

---

This invention relates to glass ceramic materials and is particularly, but not exclusively, concerned with such materials and their application to glass tanks for the diminution of the wear that takes place on the tank sides at the joints in the tank formed from coursed blocks.

Excessive corrosion is known to occur at submerged horizontal joints when the width of the joint is greater than 0.25 mm. In order to reduce this form of corrosion it is necessary to grind the mating faces and accurately lay the blocks. However, it is known that blocks can move during the heating up of a furnace which would result in the joints opening up to the corrosive effect of molten glass.

According to the present invention, a glass ceramic material comprises by weight 20% to 45% $ZrO_2$, 20% to 60% $Al_2O_3$, 0% to 25% $SiO_2$, 0% to 30% CaO, 0% to 10% $Na_2O$, the material including $B_2O_3$ and/or PbO in the amounts up to 35% and 25% respectively, $B_2O_3$ in the absence of lead being in an amount more than 5%, PbO in the absence of boron being in an amount more than 2%.

Preferably the material comprises by weight 20% to 45% $ZrO_2$, 25% to 55% $Al_2O_3$, 0% to 25% $SiO_2$, 0% to 30% CaO, 0% to 10% $Na_2O$ the material including $B_2O_3$ and/or PbO in the amounts 0% to 35% and 0% to 25% respectively.

It is further preferred that the material comprises by weight 23% to 27% $ZrO_2$, 37% to 52% $Al_2O_3$, 8% to 23% $SiO_2$, 0% to 16% CaO, 0% to 2% $Na_2O$, and $B_2O_3$ and/or PbO in amounts up to 19% and 8% respectively.

The materials within the above specified ranges initially produced as a glass which is subsequently heat-treated to produce nucleation and crystallisation throughout the body to produce a semi-crystalline ceramic material in which the crystals are fine and homogenously dispersed. Such ceramic materials have melting temperatures in the range 1,500° C. to 1,800° C. approximately.

Due to the relatively high melting temperatures of the material, such material is eminently suited for use in high temperature environments, either as a cement between coursed blocks in, e.g., a glass furnace wall and throat assembly or as a pre-formed body adapted to operate in high temperature environments, e.g., feeder channel spout assembly components. In the latter applications, because the material is initially glass, it may be formed into an appropriately shaped body by methods generally similar to conventional methods presently applied to the production of glass articles. After subsequent heat treatment the body will have no voids formed within its depth, as is the case with conventional fused cast material. In all cases the subsequent heat treatment effects the nucleation and crystallisation necessary to convert the glass into a semi-crystalline ceramic.

As far as the application of the invention to a cement is concerned the material in the form of batch constituents would first be heated until molten and then subjected to rapid cooling, e.g., by pouring into water, the resultant particulate glass being ground, e.g., in a ball mill. The material, then in the form of a powder, is formed to a suitable consistency by mixing it with a temporary bonding material, e.g., one having a cellulosic base and added water. In addition to the temporary bond, or if in suitable form instead of the temporary bond, a permanent bonding material may be introduced, with the exception of carbonaceous bonds (pitch and the like) and known bonding material for refractory materials may be used, such as phosphate bonding materials. Additionally, materials such as grog may be introduced having the advantage of introducing additional refractory materials into the mixture that promote further nucleation, and which reduce shrinkage particularly on subsequent firing. After the application of the cement to the joint between two blocks, subsequent heating of the material, when the furnace is put into operation or initially pre-heated, results in the nucleation and crystallisation throughout the material to produce the semi-crystalline glass ceramic joint. The temporary bonding material should also be capable of giving the material a green strength sufficient to hold the cement in place in the interim period where the material has been dried but nucleation and crystallisation are not effected.

At present, it is accepted practice to use soldier blocks (mono) in the construction of side walls of glass furnaces, except in very deep tanks when it is not economically feasible, with a view to eliminating the excessive corrosion known to occur at submerged horizontal joints. Also, since excessive corrosion is known to occur at the top of the block in the region of the glass surface, it is necessary to employ expensive fused cast zirconia/alumina/silica blocks. There are however other submerged horizontal joints within a glass tank such as at the throat assembly which cannot be eliminated by any means presently known.

With this in mind, the materials may be used as a cement which will facilitate the use of multicourse side walls, the lower course(s) of which comprises less expensive refractory blocks, since corrosion is not as great further down the tank, when the working life of the furnace could be extended considerably because of the diminished rate of wear at the sumberged horizontal joints where excessive corrosion is known to occur, and also at any other joints of the glass furnace which may be intermittently contacted by molten glass and/or subjected to the corrosive nature of the furnace atmosphere.

The choice of a particular material within the broad range is dictated by the ultimate application of the material because the refractoriness and the corrosion resistance of the material can be varied. The following table 1 shows nine examples of materials within the broad range, all eminently suitable for use as a cement.

TABLE 1

| | $ZrO_2$ | $Al_2O_3$ | $SiO_2$ | $B_2O_3$ | PbO | CaO | $Na_2O$ | Melting temperature |
|---|---|---|---|---|---|---|---|---|
| 1 | 26 | 41 | 17 | 5 | 4 | 5 | 2 | 1,690 |
| 2 | 25 | 39 | 25 | 4 | 1 | 6 | 2 | 1,660 |
| 3 | 26 | 41 | 9 | 9 | 2 | 11 | 2 | 1,660 |
| 4 | 26 | 38 | 9 | 9 | 2 | 14 | 2 | 1,660 |
| 5 | 23 | 41 | 12 | 5 | 1 | 16 | 2 | 1,630 |
| 6 | 25 | 46 | 8 | 19 | | | 2 | 1,730 |
| 7 | 23 | 52 | 21 | | 4 | | | 1,760 |
| 8 | 23 | 50 | 20 | | 2 | 5 | | 1,700 |
| 9 | 27 | 46 | 19 | | 8 | | | 1,780 |

The presence of high zirconia in the material provides good resistance to corrosion and good refractoriness. By providing a relatively high alumina content there is again the enhancing of the refractoriness and an increase in the corrosion resistance. In addition the presence of alumina within the range stated assists in the formation of a glass. Silica within the range stated is believed to introduce a glass network formation into the material. The presence of boron or lead (or both) in the material assists in taking the zirconia into solution, and both act as fluxes tending to reduce the melting temperature as well as assisting in the promotion of glass formation. In addition to this, boron when present acts as a nucleating agent. Lime when present acts as a flux to take zirconia into solution and thereby assists the act of boron or lead (or both) that are present. Soda serves as a flux reducing the melting temperature of the material and also reacts with other constituents to form low melting point compounds.

The following is an example of the use of the materials of the invention as a cement suitable for sealing joints in a glass tank, particularly submerged horizontal joints. In the laboratory glass tank, a number of horizontal slots were cut into the refractory material of substantially the same depth as a joint to be found in a commercial glass furnace. One such slot was left open to act as an open joint for comparison purposes. The slots were then filled with the materials of the Examples of the Table. The glass tank was then held for 3 months at 1,450° C. On examination of the joints it was found that those filled with the material according to the Examples 1 and 3 to 9 exhibited corrosion that was approximately 5% of the corrosion that was found in the open joint, and that of Example 2 2% of the corrosion that was found in the open joint.

The following is an example of the use of the materials of the invention as a cement capable of bonding blocks of refractory material together particularly in the superstructure of a glass tank. Fingers of refractory material were bonded together by cements formed from the materials of Examples 1 and 2 of the Table, and suspended in a laboratory furnace for 24 hours. Fingers of refractory material bonded by a conventional high temperature cement were similarly hung in the furnace for comparison purposes. The fingers were caused to move in the furnace by suspending them from a revolving disc, and a mixture of sodium sulphate and sheet glass batch sprayed at the fingers, to simulate conditions above the melt in a glass tank.

The fingers bonded by the cements of the invention were seen to exhibit better resistance to corrosion, and greatly improved resistance to the break down of the bond, than those bonded by conventional high temperature cements.

According to the precise amounts of materials selected from the broad range, the temperature required to melt the materials can vary from approximately 1,500° C. to approximately 1,800° C. and the higher the temperature the more expensive is the material to produce. The amounts of the various materials also determine the nature of the refractory phases that exist in the glass ceramic material and the amounts of glassy phases that co-exist with the refractory phases. Therefore, there is provided by the invention an ability to select materials from the broad range to suit the particular application to which it is to be put, i.e., it is only necessary to utilise the relatively expensive and highly refractory glass ceramics produced in accordance with the invention in conditions where excessively corrosive errosive environments and/or high temperature conditions will be encountered, leaving the relatively less expensive and less refractory materials to be used in less arduous conditions.

What we claim is:

1. A glass ceramic material comprising by weight 20% to 45% $ZrO_2$, 20% to 60% $Al_2O_3$, 0% to 25% $SiO_2$, 0% to 30% CaO, 0% to 10% $Na_2O$, the material including at least one material selected from the group $B_2O_3$ and PbO, in the amounts up to 35% and 25% respectively sufficient to assist in taking said $ZrO_2$ into solution during the melting of said glass ceramic material, $B_2O_3$ in the absence of PbO being in an amount more than 5%, PbO in the absence of $B_2O_3$ being in an amount more than 2%.

2. A glass ceramic material as in claim 1, wherein the material comprises by weight 20% to 45% $ZrO_2$, 25% to 55% $Al_2O_3$, 0% to 25% $SiO_2$, 0% to 30% CaO, 0% to 10% $Na_2O$, the material including $B_2O_3$ and/or PbO in the amounts 0% to 35% and 0% to 25% respectively.

3. A glass ceramic material as in claim 1, wherein the material comprises by weight 23% to 27% $ZrO_2$, 37% to 52% $Al_2O_3$, 8% to 23% $SiO_2$, 0% to 16% CaO, 0% to 2% $Na_2O$, and $B_2O_3$ and/or PbO in amounts up to 19% and 8% respectively.

4. A glass ceramic material according to claim 1 wherein the material comprises by weight 26% $ZrO_2$, 41% $Al_2O_3$, 17% $SiO_2$, 5% $B_2O_3$, 4% PbO, 5% CaO, and 2% $Na_2O$.

5. A glass ceramic material according to claim 1 wherein the material comprises by weight 25% $ZrO_2$, 39% $Al_2O_3$, 25% $SiO_2$, 4% $B_2O_3$, 1% PbO, 6% CaO and 2% $Na_2O$.

6. A glass ceramic material according to claim 1 wherein the material comprises by weight 26% $ZrO_2$, 41% $Al_2O_3$, 9% $SiO_2$, 9% $B_2O_3$, 2% PbO, 11% CaO, 2% $Na_2O$.

7. A glass ceramic material according to claim 1 wherein the material comprises by weight 26% $ZrO_2$, 38% $Al_2O_3$, 9% $SiO_2$, 9% $B_2O_3$, 2% PbO, 14% CaO, 2% $Na_2O$.

8. A glass ceramic material according to claim 1 wherein the material comprises by weight 23% $ZrO_2$, 41% $Al_2O_3$, 12% $SiO_2$, 5% $B_2O_3$, 1% PbO, 16% CaO, 2% $Na_2O$.

9. A glass ceramic material according to claim 1 wherein the material comprises by weight 25% $ZrO_2$, 46% $Al_2O_3$, 8% $SiO_2$, 19% $B_2O_3$, 2% $Na_2O$.

10. A glass ceramic material according to claim 1 wherein the material comprises by weight 23% $ZrO_2$, 52% $Al_2O_3$, 21% $SiO_2$, 4% PbO.

11. A glass ceramic material according to claim 1 wherein the material comprises by weight 27% $ZrO_2$, 46% $Al_2O_3$, 19% $SiO_2$, 8% PbO.

References Cited

UNITED STATES PATENTS 3,236,662　2/1966　MacDowell _____ 106—390 V

OTHER REFERENCES

McMillan, P. W., *Glass Ceramics*, Academic Press, London and New York, pp. 74 and 75.

ALLEN B. CURTIS, Primary Examiner

M. L. BELL, Assistant Examiner

U.S. Cl. X.R.

106—53, 54